US010278067B2

(12) United States Patent
Bradish

(10) Patent No.: US 10,278,067 B2
(45) Date of Patent: *Apr. 30, 2019

(54) METHODS AND SYSTEMS FOR ASSOCIATING SOCIAL MEDIA TO WIRELESS IDENTIFIERS

(71) Applicant: CECELUMEN, LLC, Camarillo, CA (US)

(72) Inventor: Stillman Bradish, Washington, DC (US)

(73) Assignee: CECELUMEN, LLC, Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,879

(22) Filed: Jun. 6, 2017

(65) Prior Publication Data

US 2017/0272938 A1 Sep. 21, 2017

Related U.S. Application Data

(63) Continuation of application No. 14/617,983, filed on Feb. 10, 2015, now Pat. No. 9,693,222.

(Continued)

(51) Int. Cl.
*H04W 8/26* (2009.01)
*H04L 29/12* (2006.01)
(Continued)

(52) U.S. Cl.
CPC .......... *H04W 8/26* (2013.01); *H04L 61/2007* (2013.01); *H04L 67/02* (2013.01); *H04L 67/14* (2013.01);
(Continued)

(58) Field of Classification Search
CPC ....... H04W 8/18; H04W 8/005; H04W 48/12; H04W 48/17; H04L 67/14; H04L 67/22; H04L 67/02

See application file for complete search history.

(56) References Cited

U.S. PATENT DOCUMENTS

2005/0174975 A1* 8/2005 Mgrdechian ....... G06Q 30/0207
370/338
2009/0011743 A1* 1/2009 Johanson .......... H04M 3/42068
455/414.1

(Continued)

*Primary Examiner* — Mewale A Ambaye
(74) *Attorney, Agent, or Firm* — Straub & Straub; Michael P. Straub; Stephen T. Straub

(57) ABSTRACT

Methods and systems for associating or accessing one or more social media profiles are disclosed herein. The system may include one or more unconnected (Wireless Enabled Devices) WEDs which may broadcast or detect a beacon message, where the beacon message may include the MAC address or other wireless identifier of the broadcasting WED (Wireless Enabled Device). The detecting WED may send a query to an API for accessing or retrieving one or more social media profiles that may be associated with the detected MAC address. The API may check the detected MAC address against a plurality of MAC addresses previously registered in a registry. The API may retrieve links stored in the registry and associated with the registered MAC address. The API may send these links to the detecting WED which may use the links to automatically retrieve one or more social media profiles from third-party providers.

11 Claims, 5 Drawing Sheets

Related U.S. Application Data

(60) Provisional application No. 61/938,836, filed on Feb. 12, 2014.

(51) Int. Cl.
| | | |
|---|---|---|
| *H04L 29/08* | (2006.01) | |
| *H04W 48/00* | (2009.01) | |
| *H04W 48/12* | (2009.01) | |
| *H04W 8/00* | (2009.01) | |
| *H04W 8/18* | (2009.01) | |

(52) U.S. Cl.
CPC ............ *H04L 67/22* (2013.01); *H04L 67/306* (2013.01); *H04W 8/005* (2013.01); *H04W 8/18* (2013.01); *H04W 48/12* (2013.01); *H04W 48/17* (2013.01); *H04L 61/6022* (2013.01)

(56) References Cited

U.S. PATENT DOCUMENTS

| | | | | |
|---|---|---|---|---|
| 2013/0124309 | A1* | 5/2013 | Traasdahl | H04L 67/22 705/14.49 |
| 2014/0181245 | A1* | 6/2014 | Richardson | H04L 67/26 709/217 |
| 2014/0194153 | A1* | 7/2014 | Salkintzis | H04W 4/12 455/466 |

* cited by examiner ical field

The present disclosure relates in general to wireless networks, and more specifically to methods and systems for associating wireless identifiers to social media profiles.

BACKGROUND

Social media networks allow the sharing of social media profiles and personal information through the web. However, sharing of social media profiles often require users to manually submit their credentials into respective social networks, followed by a series of steps or actions before sharing of media profiles can take place.

What is needed is a system or method that may allow a more dynamic and efficient sharing of personal media profiles.

SUMMARY

Systems and methods for associating social media profiles with wireless identifiers are disclosed herein. Social media profiles may include Facebook, LinkedIn, Myspace, Google+, and Twitter, among others. Wireless identifiers may include MAC addresses, service set identifiers (SSIDs), radio-frequency identification (RFID) tags, Bluetooth addresses, near field communication (NFC) tags, and hashtag dongle IDs, among others.

In one embodiment, a computer-implemented method comprises receiving, by a registration computer, from a first wireless device a first wireless identifier identifying the first wireless device; querying, by the computer, a datastore storing one or more records of one or more wireless devices, wherein each respective record is associated with each respective wireless device, and wherein each respective record contains one or more wireless identifiers; generating, by the computer, a record of the first wireless device in response to determining the first wireless identifier is a new identifier; receiving, by the computer, from the first wireless device a link configured to access a social media server; storing, by the computer, the link into the record of the first wireless device; receiving, by the computer, from a second wireless device a query requesting one or more links associated with the first wireless identifier; querying, by the computer, the datastore according to the query in response to receiving the query from the second wireless device; and transmitting, by the computer, to the second wireless device the link stored in the record of the first wireless device in response to identifying the record of the first wireless device.

Additional features and advantages can become apparent from the detailed descriptions which follow, taken in conjunction with the accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
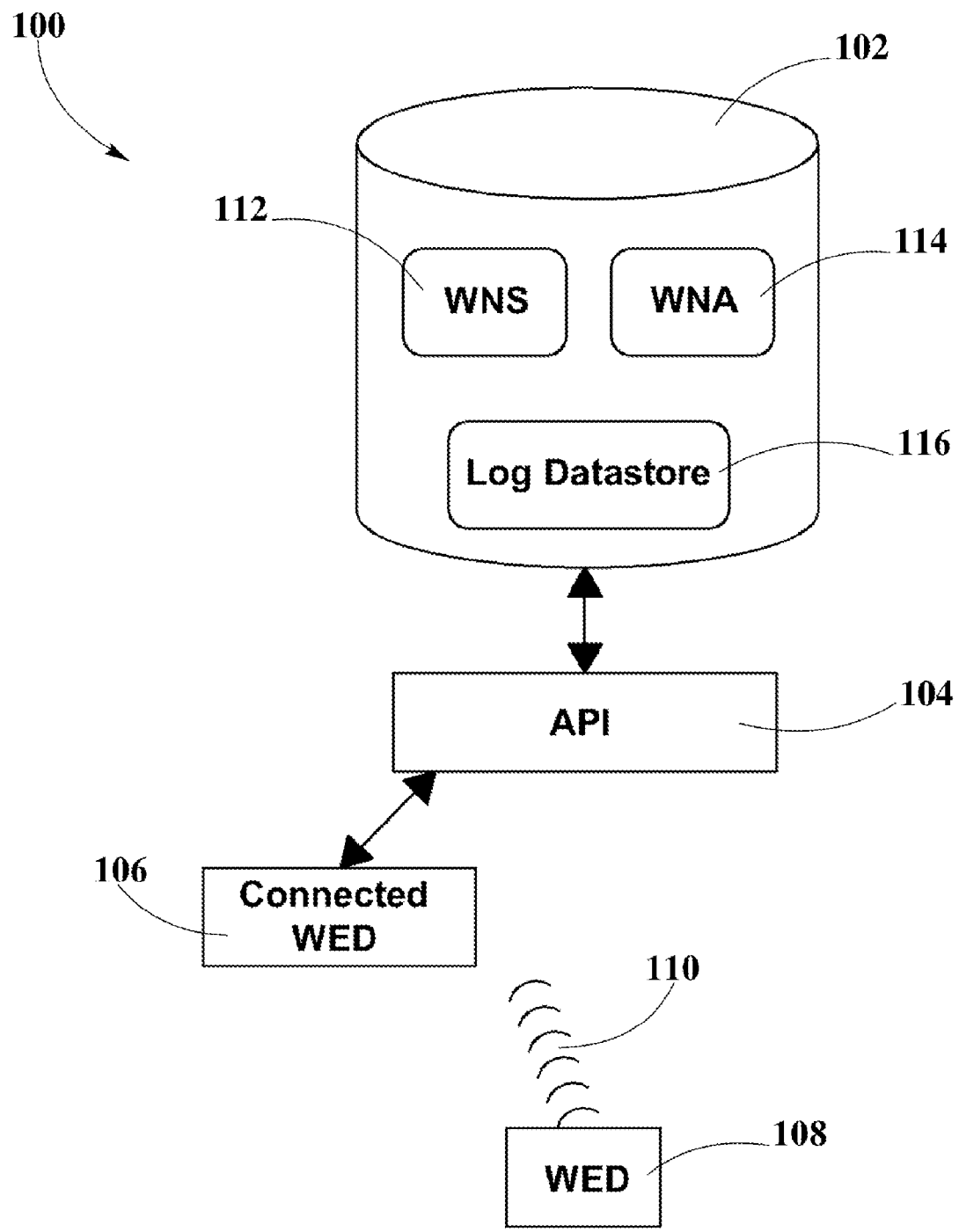
FIG. 1 illustrates a block diagram of a wireless ID system for associating MAC addresses or other wireless identifier with social media profiles and other personal information.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Registry" refers to any component in a system suitable for storing at least one type of information about one or more other components of the system and/or one or more users of the system.

"Wireless Enabled Device", or "WED" refers to any electronic device capable to communicate using one or more suitable wireless technologies.

"Connected WED" refers to a WED suitability connected to an information string server and API.

"Unconnected WED" refers to a WED without a suitable connection to an information string server and API.

"Beacon Message" refers a signal transmitted or received by an unconnected WED or connected WED, where this signal may contain a wireless identifier or other network information string.

User" refers to an individual who may operate, use, or have access to the configuration or functioning of the different elements or components of a wireless ID system.

The disclosed methods and systems may allow the dynamic and automatic retrieval, sharing or access of social media profiles by detecting the MAC address or other wireless identifier of a connected or unconnected wireless enable device (WED).

Although the embodiments described herein make reference to Wi-Fi (802.11) communication protocols and information exchanges, it should be appreciated that in other embodiments any wireless communication technology (i.e., hardware, software, and protocols) may be implemented. Suitable WED hardware may be able to implemented or otherwise use a wireless signal or technology of any type, such as Bluetooth®, Wi-Fi, WiMax, SuperWiFi, LTE systems, LTE Direct, Wi-Fi Direct, or any other wireless signal or technology. Wireless technologies involved in this applications may be any technology that may wirelessly transmit name strings and wirelessly transmit wireless IDs of any kind (e.g., LTE Direct Expressions and LTE Hardware ID, Universal Unique Identifier (UUID), SSID and MAC). A person having ordinary skill in the art would appreciate that the terms SSID and Mac, as used herein, may be understood as including other wireless technologies (e.g., Bluetooth® names, LTE-Direct Expressions, etc).

According to an embodiment, a wireless ID system may include one or more unconnected or connected WEDs that may detect or broadcast a beacon message, where this beacon message may include a wireless identifier; an application programming interface (API) operatively coupled to and executed by connected or unconnected WEDs or registry device; and a registry which may include a wireless name system (WNS) for storing wireless identifiers, a wireless name associator (WNA) for storing links, and a log datastore for storing API logs. Links stored in WNA may be used for accessing or retrieving one or more social media profiles from one or more third-party service providers, where the social media profiles may be associated with the WED transmitting the wireless identifier.

In one embodiment, a registration process of one or more wireless identifiers in a wireless ID system may include the steps of automatically retrieving the MAC address or other wireless identifier from a connected or unconnected WED using a registration application; registering the MAC address or other wireless identifier in the WNS of the registry; and associating the registered MAC address or wireless identifier with one or more links stored in the WNA of the registry, where these links may be used for automatic access or retrieval of one or more social media profiles from third-party providers.

In another embodiment, a process for accessing or retrieving one or more social media profiles may include the steps of detecting a beacon message broadcast by a connected or unconnected WED, where the beacon message may include the MAC address or other wireless identifier of the broadcasting WED; checking the detected MAC address or wireless identifier in the WNS of the registry; registering the detected MAC address or wireless identifier in case it was not previously registered; and accessing social media profiles from third-party providers using the links stored in the WNA of the registry, where these links may be associated with the registered MAC address or other wireless identifier of the broadcasting WED.

In a further embodiment, a wireless ID system may be used for retrieving or accessing one or more social media profiles using the MAC address or other wireless identifier broadcast from an electronic bracelet.

Yet in another embodiment, a wireless ID system may be used for retrieving or accessing one or more social media profiles when a connected or unconnected WED is within an specific area or enters a store. According to some aspects of this embodiment, the retrieved social media profiles can be displayed in a monitor inside the store. In addition, advertisements, sale offers, coupons or other related information can be automatically provided to the connected or unconnected WED when it enters the store.

In an even further embodiment, a wireless ID system may be used for retrieving or accessing one or more social media profiles associated with RFID or NFC tags embedded in a key.

FIG. 1 is a block diagram of a wireless ID system 100 for associating MAC addresses or other wireless identifiers with social media profiles and other personal information, according to an embodiment.

System 100 may include a registry 102; an application programming interface API 104; a least one connected WED 106 operatively coupled with API 104; and one or more connected or unconnected WEDs 108 operatively coupled with connected WED 106 or API 104.

Connected WED 106 may include a transceiver, a memory, a display, a communication application, a string utilization application, and a processor. By a way of illustration and not by way of limitation, connected WED 106 may include cell phones, smartphones, access points, routers, networking switches, tablet computers, desktop computers, PDAs, banking terminals, cash register and the like. The communication application may provide instructions to the processor to enable connected WED 106 to interact with one or more unconnected WEDs 108, or other connected WEDs 106. Connected WED 106 may be operatively coupled with API 104 and registry 102 through suitable network connections that may include intranets, internet, local area networks (LAN), the cloud, virtual private networks (VPN), wireless area networks (WAN) and the internet among others.

Similarly, connected or unconnected WED 108 may include a transceiver, a memory, a processor, a communication application, a display, and a string utilization application. By a way of illustration and not by way of limitation, connected or unconnected WED 108 may include smartphones, laptop computers, tablet computers, and PDAs, among others. In other embodiments, connected or unconnected WED 108 may include home appliances, electronic toys, Bluetooth or Wi-Fi enabled cloth or shoe apparel, RFID cards, NFC enabled devices, electronic bracelets, Bluetooth trackers, vending machines, Wi-Fi enabled cars, and the like. The communication application may provide instructions to the processor to at least enable connected or unconnected WED 108 to transmit a beacon message 110.

According to some aspects of this embodiment, beacon message 110 may transmit a wireless identifier which may include the MAC address or other wireless identifier of unconnected or connected WED 108. The MAC address of connected or unconnected WED 108 can be registered or stored in WNS 112, where registered or stored MAC addresses can be associated with social media profiles of users of system 100. More specifically, the MAC address of WED 108 registered in WNS 112 may be associated with links stored in WNA 114, where these links may provide access to social media profiles. Social media profiles may include Facebook, LinkedIn, Myspace, Google+, and Twitter, among others. Third-party providers (not shown in FIG.

1) of social media profiles may be operatively connected to WEDs 106, 108 through suitable network connections that may include intranets, internet, local area networks (LAN), the cloud, virtual private networks (VPN), wireless area networks (WAN) and the internet among others. Third-party providers may also include companies who may share advertisements or other content related to the products or services that they offer.

Examples of WNS 112 and WNA 114 may include MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. Both, WNS 112 and WNA 114, can be part of a ownership module of registry 102 which can be accessed or managed by a user of system 100.

MAC addresses registered in WNS 112 may also be associated with personal information of users, where this personal information may be stored in WNA 114. Personal information may include name, phone number, email, civil-status, mailing address, and occupation, among others. In addition, MAC addresses registered in WNS 112 may be associated with other content stored in WNS 112 such as pictures, videos, announcements, menus, and news alerts, among others.

The wireless identifier transmitted in beacon message 110 may also include the SSID and/or MAC address of connected or unconnected WEDs 108, or a combination thereof, where the SSID and/or MAC address, or combination thereof, may be registered in WNS 112 and associated with links stored in WNA 114, where these links may be used for accessing social media profiles of users.

According to some aspects of this embodiment, users of system 100 may download a registration application from API 104 to connected or unconnected WED 108, where this registration application can be used for automatically retrieving the MAC address or other wireless identifier of connected or unconnected WED 108 and registering said MAC address in WNS 112. The user of WED 108 may consequently have the option of associating the registered MAC address with links stored in WNA 114, where these links may allow the automatic retrieval or access of social media profiles from third-party providers. In another embodiment, web-based or mobile applications of third-party providers, i.e. Facebook or LinkedIn, may download the MAC address of connected or unconnected WED 108 and register said MAC address in WNS 112. Yet in another embodiment, users of system 100 may have the option of selecting a "do not track" option when registering MAC addresses or other wireless identifier, where this "do not track" option may prevent the association of social media profiles or other content with registered MAC addresses or other wireless identifier.

Connected WED 106 may receive or detect one or more beacon messages 110 broadcast from one or more connected or unconnected WEDs 108 or another connected WED (not shown), where beacon message 110 may include the MAC address or other wireless identifier of WED 108. Connected WED 106 may send a query to API 104 for retrieving social media profiles associated with the detected MAC address of WED 108. API 104 may check the detected MAC address against a list of MAC addresses previously registered in WNS 112. If the detected MAC address was previously registered in WNS 112, then API 104 may check for links in WNA 114 associated with the detected MAC address of connected or unconnected WED 108. These links may provide automatic access to one or more social media profiles associated with MAC address of WED 108. API 104 may send these links to connected WED 106 for direct and automatic access to corresponding social media profiles. Using the provided links, connected WED 106 may directly retrieve or access social media profiles from the third-party providers, where these social media profiles may be associated with the detected MAC address of connected or unconnected WED 108.

API 104 may be implemented though suitable computing equipment running high-volume programming languages for processing numerous queries at the same time. By a way of illustration and not by way of limitation, high-volume programming languages may include Erland and Cassandra, among others.

Information about queries for the registration of MAC addresses and the retrieval of social media profiles may be stored in the form of API logs in a log datastore 116. This log datastore 116 may be included in registry 102, but may not be part of the ownership module, meaning that the data logged in log datastore 116 may not be directly controlled by a user of system 100. In general, the utilization of API logs in log datastore 116 may be managed by API 104 according to the application.

In other embodiments, system 100 may be capable of associating social media profiles with other wireless identifiers such as RFID tags, NFC tags, Bluetooth network addresses, and hashtag dongle IDs, where these wireless identifiers can be used in WEDs 106 and/or WEDs 108, and may be registered in WNS 112 of registry 102.

Figure 2:
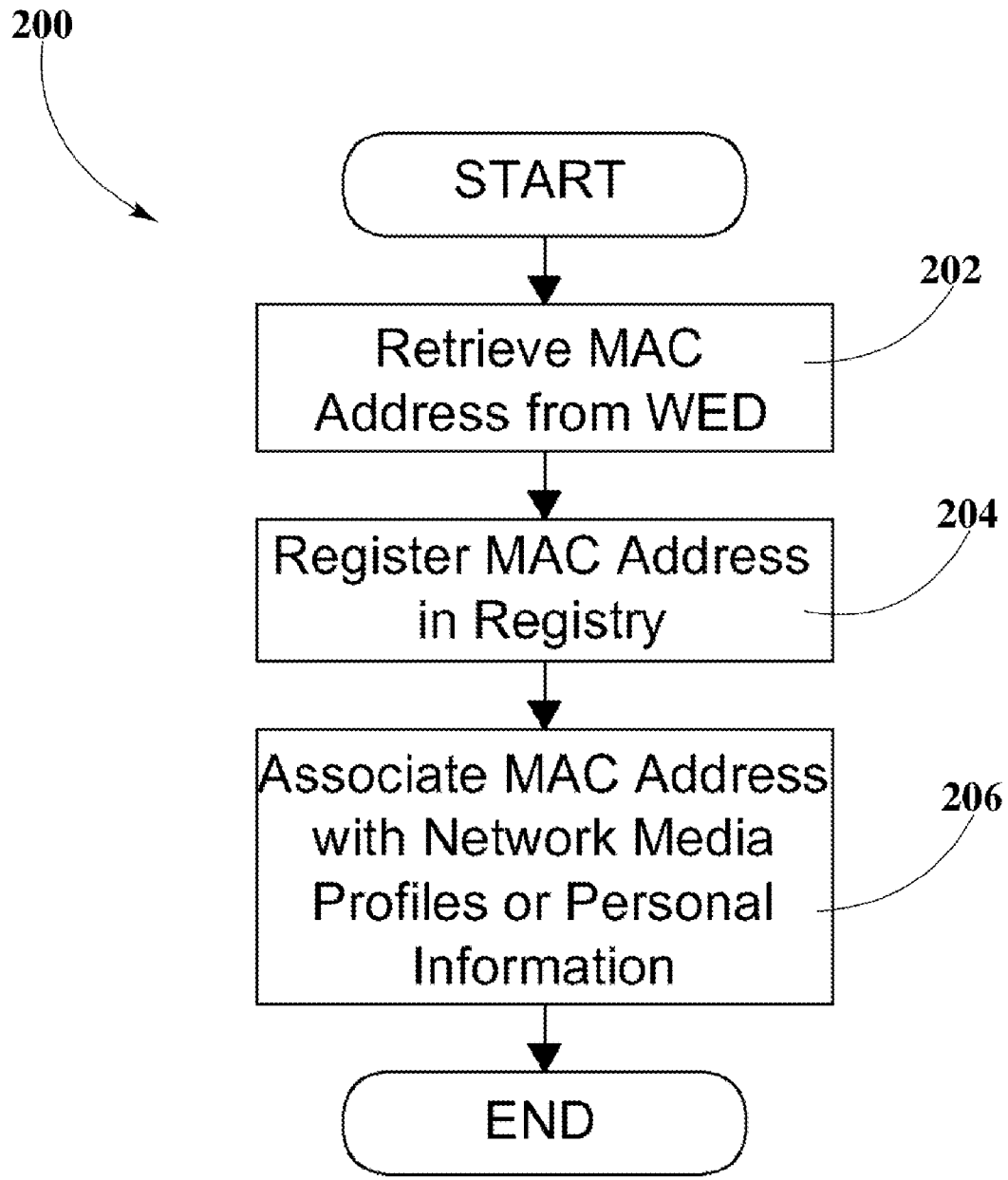
FIG. 2 shows a flowchart of a process for the registration and association of MAC addresses or other wireless identifier in a wireless ID system.

FIG. 2 is a flowchart of a process 200 for the registration and association of MAC addresses or other wireless identifier in a wireless ID system, according to an embodiment.

Process 200 may begin when the MAC address of a connected or unconnected WED may be retrieved, at step 202. According to some aspects of this embodiment, one or more connected or unconnected WEDs may download a registration application from the registry of the wireless ID system. More specifically, users of connected or unconnected WEDs may connect to an API executed by a device servicing downloads and execution of the API; the WED may download the registration application from the registry, where this registration application may be installed in the connected or unconnected WED to automatically retrieve the MAC address or other wireless identifier. For example, the connected or unconnected WED may be a smartphone which may use the internet to connect to the API and download/install the registration application, where this registration application may automatically retrieve the MAC address of the smartphone. In other embodiments, depending of the type of connected or unconnected WED and operation, the registration application may retrieve other wireless identifiers such as RFID tags, NFC tags, SSIDs, Bluetooth addresses, and hashtag dongle IDs, among others.

At step 204, the registration application may send the MAC address or other wireless identifier of the connected or unconnected WED to the API which may check if the retrieved MAC address is registered in the WNS of the registry. If the retrieved MAC address was not previously registered in the WNS, API may proceed to register the MAC address in the WNS. In other embodiments, the API may register other wireless identifiers such as RFID tags, NFC tags, SSIDs, Bluetooth addresses, and hashtag dongle IDs, among others. In some implementations, during registration, the registry device executing the API or the database hosting the WNS may generate a database record of the wireless identifier in the WNS. The WNS may be logically organized using any schema capable of storing, querying, and retrieving the registered wireless identifiers and associated links.

Subsequently, at step 206, the API may associate the registered MAC address or other wireless identifier with links that may be stored in the WNA of the register. These links may provide direct and automatic access to social media profiles which may include Facebook, LinkedIn, Myspace, Google+, and Twitter, among others. API may select which links or social media profiles to be associated with the registered MAC address depending on users' requirements. In another embodiment, the API may select a "do not track" option which may prevent the registered MAC address or other wireless identifier from being associated to social media profiles, or to restrict the availability of social media profiles to certain users or WEDs associated with registered MAC addresses or other wireless identifiers.

Figure 3:
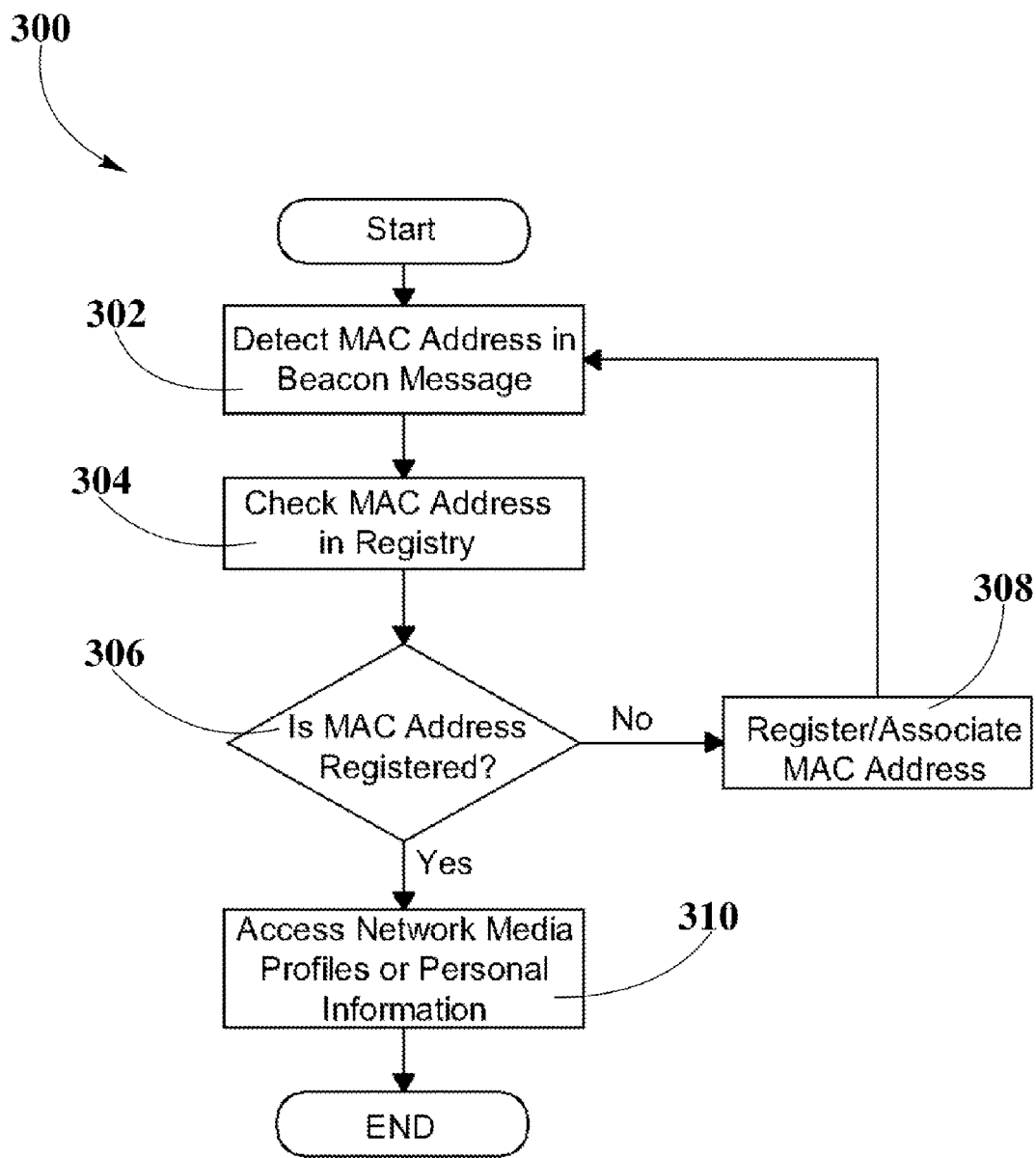
FIG. 3 depicts a flowchart of a process for accessing social media profiles associated with MAC addresses or other wireless identifier in a wireless ID system.

FIG. 3 shows a flowchart of a process 300 for accessing social media profiles associated with MAC addresses or other wireless identifiers in a wireless ID system, according to an embodiment.

Process 300 may start when at least one connected WED, operatively coupled with the API and registry of the wireless ID system, may detect one or more beacon messages broadcast by one or more connected or unconnected WEDs, at step 302. For the purpose of illustrating this embodiment, the device which detects the beacon message may be called detecting WED, while the device which transmits the beacon message may be called broadcasting WED. This beacon message may include the MAC address of the broadcasting WED. In other embodiments, the beacon message may include other network or wireless identifiers such as RFID tags, NFC tags, SSIDs, Bluetooth addresses, and hashtag dongle IDs, among others.

The detecting WED may send a query to the API for retrieving social media profiles that may be associated with the detected MAC address. Social media profiles may include Facebook, LinkedIn, Myspace, Google+, and Twitter, among others. The query sent to the API may include the detected MAC address or other wireless identifier, according to the type and application of the broadcasting WED. The API may check the detected MAC address or other wireless identifier of the broadcasting WED in the WNS of the registry, at step 304.

The API may verify if the detected MAC address or other wireless identifier is registered in the WNS of the registry, at step 306. If the detected MAC address is not registered in the WNS, then API may request the registration of the detected MAC address, at step 308. In this case, the broadcasting WED may establish a direct communication with the API and registry to download and install a registration application that may allow the automatic retrieval of the MAC address or other wireless identifier. The registration process may include storing the MAC address in the WNS of the registry, and associating the registered MAC address with links stored in the WNA, where these links may be used for automatically accessing one or more social media profiles. In another embodiment, the detecting WED may request the registration of the MAC address of the broadcasting WED.

Process 300 may repeat steps 302, 304, 306 as illustrated in FIG. 3, until the detected MAC address or wireless identifier of the broadcasting WED may be registered in the WNS.

If the detected MAC address or other wireless identifier is registered in the WNS of the registry, at step 306, then process 300 may continue with the API accessing or retrieving one or more links associated with the detected MAC address or wireless identifier, at step 310. More specifically, the API may look for links stored in the WNA of the register, where these links may be associated with the MAC address registered in the WNA. The API may send these links to the detecting WED which may use the links to connect to third-party providers and automatically access one or more social media profiles associated to the detected MAC address.

In another embodiment, the API may send notifications or may perform further actions after checking the detected MAC address in the registry. For example, the API may send messages, notifications, emails, suggestions and the like, to broadcasting or detecting WEDs regarding the registration status of detected MAC addresses or other wireless identifiers, and/or their associations with social media profiles.

Figure 4:
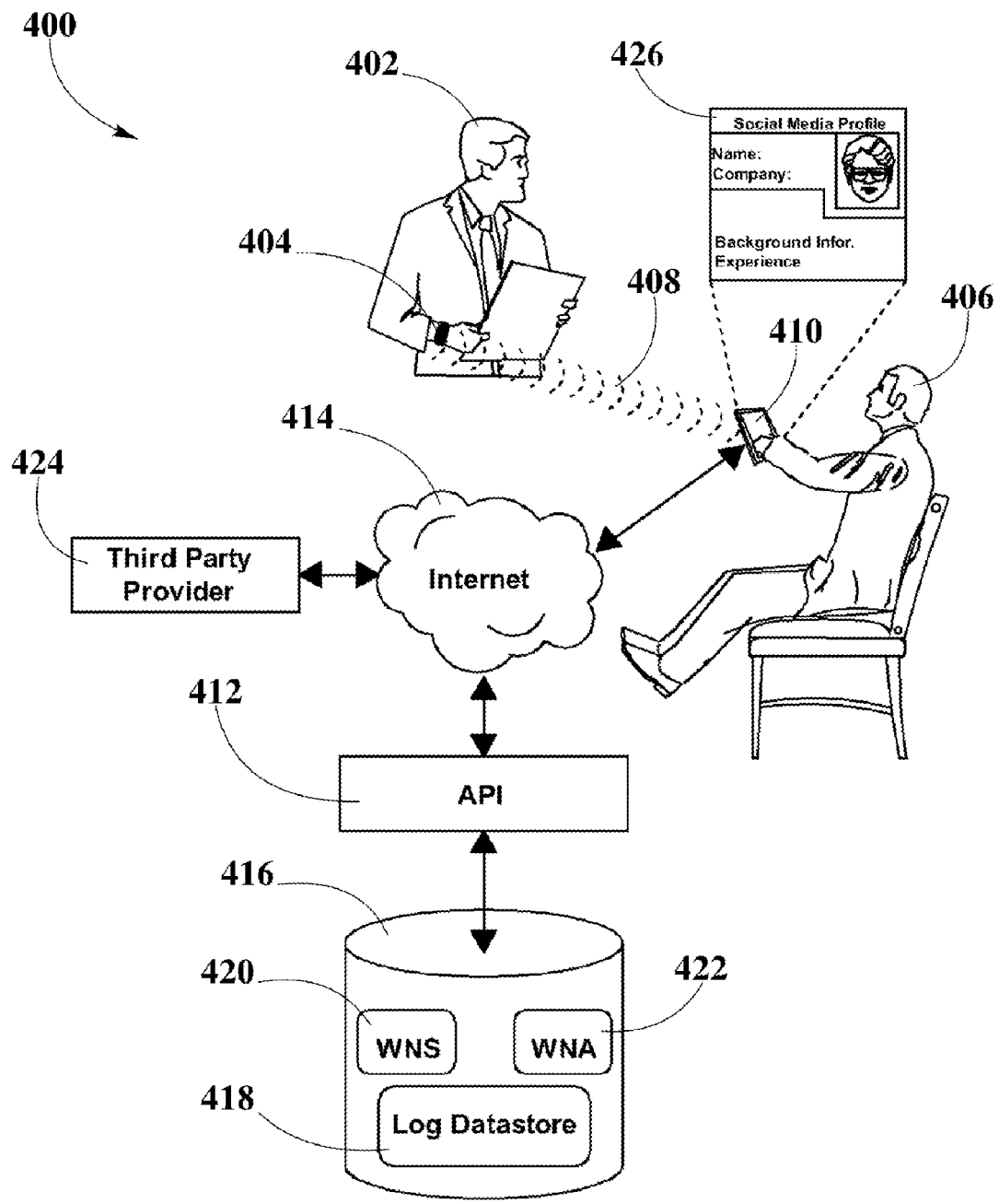
FIG. 4 shows exemplary application of a wireless ID system, where the MAC address or other wireless identifier of an electronic bracelet can be associated with social media profiles.

FIG. 4 is an exemplary application of a wireless ID system 400, where the MAC address or other wireless identifier of an electronic bracelet can be associated with one or more social media profiles, according to an embodiment.

According to some aspects of this embodiment, a presenter 402 may be wearing an electronic bracelet 404 for transmitting a wireless identifier that may allow one or more listeners 406 to directly access one or more social media profiles of presenter 402. Presenter 402 may be an individual in a business or technology conference, a sales presentation, a product show, an academic lecture, a political meeting, and the like, where presenter 402 may want to share his or her social media profiles to respective listeners 406 or audience. Social media profiles may include Facebook, LinkedIn, Myspace, Google+, and Twitter, among others.

Electronic bracelet 404 may be a device operable with one or more communication technologies such as Wi-Fi, Bluetooth, NFC, LTE direct, and RFID, among others. Electronic bracelet 404 may transmit a beacon message 408 to one or more mobile devices 410 being used by listeners 406. Mobile devices 410 may include smartphones, tablet computers, laptop computers, and PDAs, among others. Mobile device 410 may be operatively coupled with API 412 and one or more third-party providers 424 through an internet connection 414. Beacon message 408 may include one or more wireless identifiers that may be unique for electronic bracelet 404, where these wireless identifiers may include MAC addresses, SSIDs, RFID tags, Bluetooth addresses, NFC tags, and hashtag dongle IDs, among others.

When mobile device 410 receives or detects beacon message 408, mobile device 410 may send a query to API 412 for retrieving or accessing one or more social media profiles that may be associated with the unique wireless identifier of electronic bracelet 404. API 412 may process the query for the retrieval of social media profiles and may store query log files in the log datastore 418 of registry 416. API 412 may check the detected wireless identifier of electronic bracelet 404 against a plurality of wireless identifiers previously registered in WNS 420 of registry 416. If the detected wireless identifier is registered in WNS 420, then API 412 may retrieve links stored in WNA 422 of registry 416, where these links may be associated with the wireless identifier of electronic bracelet 404.

API 412 may send the links to mobile device 410 which may use them to automatically access or retrieve one or more social media profiles 426 from third-party providers 424, where the retrieved social media profiles 426 may be associated to electronic bracelet 404 and may provide identifying information of presenter 402. As a way of example, identifying information disclosed in the social media profile 426 of presenter 402 may include name, company, education, professional background and experience, or other information that may be relevant to the topic or product being addressed by presenter 402.

Figure 5:
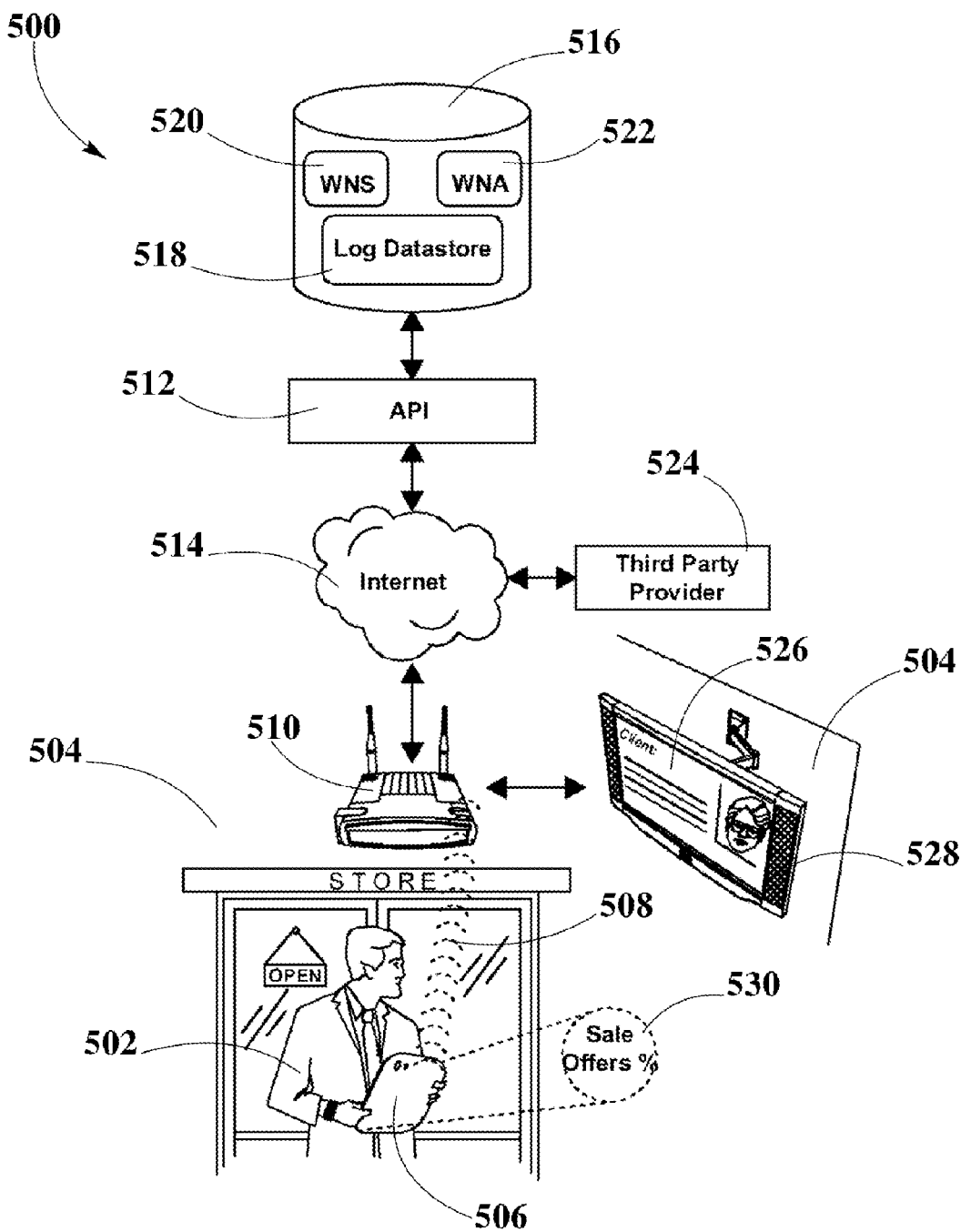
FIG. 5 illustrates an exemplary application of a wireless ID system, where the MAC address or other wireless identifier of a mobile device can be used for retrieving or accessing social media profiles.

FIG. 5 shows an exemplary application of a wireless ID system 500, where the MAC address or other wireless identifier of a mobile device can be used for retrieving or accessing social media profiles, according to an embodiment.

According to some aspects of this embodiment, a client 502 may walk into a store 504 holding a mobile device 506. As a way of example, store 504 may be a music store, a clothing store, a supermarket, a video game store, an auto parts store, an athletic store, or any other commercial establishment. Mobile device 506 may include smartphones, tablet computers, laptop computers, and PDAs, among others. Mobile device 506 may broadcast a beacon message 508 that may be detected by a router 510 inside store 504. Beacon message 508 may include one or more wireless identifiers that may uniquely identify mobile device 506. Wireless identifiers may include MAC addresses, SSIDs, RFID tags, Bluetooth addresses, NFC tags, and hashtag dongle IDs, among others.

Router 510 may detect beacon message 508 and may request the retrieval of one or more social media profiles that may be associated with the unique wireless identifier transmitted by mobile device 506. Social media profiles may include Facebook, LinkedIn, Myspace, Google+, and Twitter, among others. Router 510 may be operatively coupled with API 512 of the wireless ID system 500 through a suitable internet connection 514. API 512 may receive the request for retrieval of social media profiles based on the detected wireless identifier, and it may create query log files that may be stored in log datastore 518 of registry 516.

API 512 may check the detected wireless identifier of mobile device 506 against a plurality of wireless identifiers registered in WNS 520 of registry 516. If wireless identifier of mobile device 506 is registered in WNS 520, API 512 may retrieve one or more links associated with the wireless identifier of mobile device 506. These links may be stored in WNA 522 and be used for automatically accessing or retrieving one or more social media profiles of client 502.

API 512 may obtain the links from WNA 522 and may send them to router 510 which may be operatively coupled with one or more third-party providers 524 of social media networks through internet connection 514. Using the links, router 510 may automatically access or retrieve one or more social media profiles 526 from third-party providers 524, where social media profiles 526 may be associated with the wireless identifier broadcast by mobile device 506 or client 502.

Router 510 may be operatively coupled with a display 528 inside the store 504, where display 528 may exhibit one or more social media profiles 526 when client 502 holding mobile device 506 enters store 504 or when client 502 is within an operable range of router 510. In other words, one or more social media profiles 526 may be shown on display 528 when the wireless identifier of mobile device 506 can be detected by router 510. Display 528 may include a TV set, a computer monitor, a projector screen, and the like. In one embodiment, display 528 in the wireless ID system 500 may show social media profiles 526 of frequent or VIP clients 502 visiting store 504.

In addition, by detecting the wireless identifier transmitted by mobile device 506 and checking this detected wireless identifier in registry 516, router 510 may be capable of sending sale offers 530 to the identified client 502 or mobile device 506. Router 510 may also send coupons or other information about products or services offered at store 504. In one embodiment, information about sale offers 530, coupons, or other product information may be retrieved from WNA 522. Yet in another embodiment, information about sale offers 530, coupons, or other product information may be retrieved from a server (not shown in FIG. 5) inside store 504 and operatively coupled with router 510.

Other embodiments of wireless ID systems may include RFID or NFC cards that can be used as keys in hotels, offices, houses, stores, buildings, and the like. RFID or NFC tags can be registered in the WNS of the registry, and then, the registered RFID or NFC tags can be associated with links stored in the WNA of the registry. As in previous embodiments, these links can be used for automatically accessing or retrieving one or more social media profiles from third-party providers, where the retrieved social media profiles may be associated with the RFID or NFC tags registered in the WNS and embedded in the keys. For example, a device enabled with a RFID or NFC reader, such as a smartphone, may detect the RFID or NFC tags of a hotel key card, and may access or retrieve social media profiles related to the owner of the key card.

The exemplary embodiments can include one or more computer programs that embody the functions described herein and illustrated in the appended diagrams. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "detecting" or "connecting" or "sending" or "determining" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a registration computer, as part of a registration process, a first unique wireless identifier sent from a first wireless device to the registration computer as part of said registration process, the first unique wireless identifier identifying the first wireless device;
   receiving as part of said registration process, by the registration computer, a first link sent from the first wireless device to the registration computer, said first link being a link configured to access a social media profile of a first user at a social media server, the first user being a user of said first wireless device;
   storing, by the registration computer, the first link in a record corresponding to the first wireless device, said record including the first unique wireless identifier and said first link;
   receiving, by the registration computer, from a second wireless device which received the first unique wireless identifier in a wireless signal broadcast by the first wireless device, a query requesting information associated with the first unique wireless identifier that was included in the received wireless signal that was broadcast;
   querying, by the registration computer, a data store including the record corresponding to the first wireless device, said record including the first unique wireless identifier; and
   transmitting, by the registration computer, to the second wireless device information stored in the record corresponding to the first wireless device, said record including the first unique wireless identifier.

2. The method of claim 1, wherein the first unique wireless identifier is an address of the first wireless device.

3. The method of claim 2, further comprising:
   providing the user of the first wireless device an option of associating the address of the first wireless device with the first link configured to access the social media profile of the first user at a social media server.

4. The method of claim 1, further comprising:
   providing the user of the first wireless device an option to select a do not track option when registering the first unique wireless identifier of the first wireless device with the registration computer.

5. The method of claim 1, wherein said first unique wireless identifier is one of an RFID tag, NFC tag, Bluetooth network address or hashtag dongle ID.

6. The method of claim 1, further comprising:
   storing information relating to another social media profile in the record corresponding to the first wireless device, said record including the first unique wireless identifier.

7. The method of claim 1, further comprising:
   operating the second wireless device to access or retrieve a social media profile corresponding to the first wireless device using at least the first link.

8. The method of claim 7, further comprising:
   operating the second wireless device to display content included in the retrieved social media profile on a display device of the second wireless device; and
   wherein the retrieved social media profile includes a name and professional background of the first user.

9. The method of claim 8, wherein the first wireless device is a wearable device that transmits a beacon signal communicating the first unique wireless identifier.

10. The method of claim 9, wherein the first unique wireless identifier has been registered with the registration computer and associated with at least one profile by the time the first wireless device transmits the beacon signal to the second wireless device thereby enabling the second wireless device to retrieve profile information associated with the user of the first wireless device.

11. The method of claim 9, wherein the first wireless device is a bracelet.

* * * * *